(12) United States Patent
D'Acquisto

(10) Patent No.: US 6,568,505 B1
(45) Date of Patent: May 27, 2003

(54) CAM OPERATED HOLDING BELT FOR TREE STAND

(76) Inventor: Andrae T. D'Acquisto, 3314 E. Grange, Cudahy, WI (US) 53110

( * ) Notice: Subject to any disclaimer, the term of this patent is extended or adjusted under 35 U.S.C. 154(b) by 0 days.

(21) Appl. No.: 09/498,914

(22) Filed: Feb. 4, 2000

(51) Int. Cl.[7] .............................................. A01M 31/00
(52) U.S. Cl. ....................................... 182/187; 182/136
(58) Field of Search ................................ 182/187, 188, 182/135, 136

(56) References Cited

U.S. PATENT DOCUMENTS

| | | | |
|---|---|---|---|
| 3,900,923 A | * 8/1975 | Thomas | |
| 4,244,445 A | * 1/1981 | Strode | 182/187 |
| 4,331,216 A | 5/1982 | Amacker | 182/135 |
| 4,410,066 A | 10/1983 | Swett | 182/135 |
| 4,417,645 A | 11/1983 | Untz | 182/135 |
| 4,452,338 A | 6/1984 | Untz | 182/135 |
| 4,488,620 A | 12/1984 | Gibson | 182/135 |
| 4,683,620 A | * 8/1987 | Valsecchi | |
| 4,726,447 A | 2/1988 | Gibson et al. | 182/135 |
| 4,727,630 A | * 3/1988 | Alan | |
| 4,909,353 A | * 3/1990 | Govin | 182/187 |
| 4,953,662 A | 9/1990 | Porter | 182/135 |
| 4,969,538 A | 11/1990 | Amacker | 182/135 |
| 5,097,925 A | 3/1992 | Walker, Jr. | 182/135 |
| 5,234,076 A | 8/1993 | Louk et al. | 182/187 |
| 5,265,786 A | * 11/1993 | Mathews | 182/187 |
| 5,368,127 A | 11/1994 | Phillips | 182/187 |
| 5,443,342 A | * 8/1995 | Huang | 410/151 |
| 5,588,499 A | 12/1996 | Carriere | 182/135 |
| 5,687,455 A | * 11/1997 | Alexander | |
| 5,774,953 A | * 7/1998 | Mao | |
| 5,836,061 A | 11/1998 | Castillo et al. | 24/702 |
| 5,887,318 A | * 3/1999 | Nicoletti | |
| 5,975,242 A | 11/1999 | Woller et al. | 182/187 |
| 6,264,000 B1 | * 7/2001 | Johnson | 182/136 |
| 6,347,817 B1 | * 2/2002 | Chou | 292/259 R |

* cited by examiner

*Primary Examiner*—Alvin Chin-Shue
(74) *Attorney, Agent, or Firm*—Boyle Fredrickson Newholm Stein & Gratz S.C.

(57) ABSTRACT

A releasable securing arrangement for reliably securing a tree stand to a tree. The securing arrangement includes a pair of elongate receiving tubes secured to either side of a base or platform for the tree stand. The tubes each include a cam pivotally mounted to each tube within a cam mounting opening disposed in the tubes. Each cam includes a handle portion extending outwardly from the opening that is used to manually move the cam, and an engagement portion that is positionable within the tube and includes a number of spaced teeth. A belt formed of an elastomeric material includes a number of spaced teeth disposed along one side of the belt that are formed complementary to the teeth located on the cam. When the belt is inserted into the tube and engaged with the cam, the teeth on the cam mesh with the teeth on the belt to insure a proper locking of the cam with the belt. Furthermore, as the teeth on the belt extend completely along one side of the belt, the teeth engage the exterior surface of the tree to assist in holding the tree stand securely against the tree.

20 Claims, 2 Drawing Sheets

CAM OPERATED HOLDING BELT FOR TREE STAND

FIELD OF THE INVENTION

The present invention relates to tree stands or platforms secured about the trunk of a tree, and more specifically to a securing arrangement for holding the tree stand on the tree.

BACKGROUND OF THE INVENTION

When hunting wild game, many hunters utilize tree stands to improve their chances of a successful hunt by positioning themselves out of the line of sight of their game. The tree stands normally consist of two separate sections, namely, a lower footrest section, and an upper seating section. The seating section is positioned above the footrest section such that a hunter utilizing the tree stand may comfortably sit on the seating section and rest his feet on the footrest section while waiting for game to appear or when attempting to shoot game.

As the tree stand is normally positioned a number of feet above the ground, in order to safely use the tree stand, the tree stand must be equipped with a reliable securing mechanism that attaches the tree stand to the tree. With prior art tree stands, a number of different securing mechanisms have been utilized. In most cases, these prior art mechanisms take the form of a belt or other elongate strap-like member secured about the tree to either side of the tree stand section. The belt is normally attached to the tree stand section through the use of a pair of releasable pins, bolts, etc., located on each side of the tree stand section. To secure the belt to the tree stand section, the pins or bolts are removed from openings in the sides of the tree stand section that house the pins and are replaced in the openings after insertion through a loop, hole, or other opening disposed at each end of the belt. These types of mechanisms enable the tree stand section and the belt to hold each other against the tree stand in a secure manner.

The belt can also take a variety of forms, including a steel wire or cable encased in a garden hose, a steel wire or cable encased in a PVC hose, or a simple metal link chain. In each case, the belt includes openings at either end that allow the belt to be attached to the sides of the tree stand section.

To secure the tree stand sections on a tree using these prior art securing belt mechanisms, first, one end of the belt is attached to one side of the tree stand section. Next, the tree stand section and belt are transported up to the desired location on the tree and the stand section is positioned against the tree. The belt is then wrapped around the tree and secured to the opposite end of the tree stand section such that the belt closely conforms to and tightly engages the exterior surface of the tree. Finally, the hunter applies his weight to the stand section to engage the tree stand section with the tree and to take any slack out of the belt. In this configuration, when a hunter wishes to use the tree stand, the weight of the hunter on the tree stand section pushes downwardly on the stand section, pulling the belt into tight engagement with the exterior of the tree to hold the stand against the tree.

While securing arrangements of this type adequately hold tree stand sections in position about a tree, the mechanisms are problematic for a number of reasons. First, as the securing mechanism includes a removable bolt, pin, or similar article that secures the belt to the tree stand, these securing arrangements are often difficult to assemble when a hunter is balancing precariously a number of feet above the ground. The hunter usually cannot use both hands to assemble the mechanism as one hand is used to hold the hunter against the tree to avoid falling off of the tree.

Another problem with the tree stand securing arrangements of this type is that, due to the shape of the belt and the amount of weight which the belt is used to support, the belt often digs into the exterior surface of the tree, damaging the tree. Often, upon extended use of a tree stand in a single location, the belt penetrates completely through the bark on the tree, irreparably damaging the tree and also loosening the belt about the tree. This creates a dangerous situation where the stand becomes unstable and can easily fail when supporting a hunter using the stand.

To improve upon the prior art belts and eliminate certain of the deficiencies present in them, an improved securing arrangement for tree stand sections was developed by Summit Specialties, Inc. In the Summit securing arrangement, the belt consists of a wire cable encased within a plastic sheath that includes a number of spaced cylindrical projections at each end of the cable beneath the sheath. To use the arrangement, the cylindrical extensions are inserted into slots disposed in enclosed end pieces on both sides of the tree stand section. Each slot includes a widened lower portion and a narrow upper portion. The cable is inserted into the slot such that the selected extension for the desired belt length slides through the widened lower portion of the slot and the cable slides through the narrow upper portion. When the belt engages the exterior of the tree, the extension is pulled into contact with the enclosed end on each side of the tree stand section to hold the extension in place within the end piece beneath the slot. The end pieces also include a pivotable cover plate mounted on each end piece adjacent the slot which pivots over the slot once the cylindrical extension has been inserted to prevent the extension from becoming inadvertently released.

While eliminating the need for a bolt, pin, or other similar separable part from the securing arrangement, the Summit securing arrangement also has certain shortcomings. First, the belt is still formed of an encased wire cable that, when positioned for an extended time against a tree, will damage the exterior surface of the tree. Second, the cylindrical extensions are rigidly secured along the length of each end of the cable. Because the positions of these extensions are not adjustable along the cable, in many cases the securing arrangement cannot be adjusted to closely fit around the exterior of the tree.

Therefore, it is desirable to develop a securing arrangement for a tree stand that includes a belt which will not damage the tree and is also adjustable to closely conform to the size of the tree to which the tree stand is attached. Furthermore, the belt should include a traction surface to prevent slippage of the belt on the tree.

SUMMARY OF THE INVENTION

It is an object of the invention to provide a securing arrangement for a tree stand that has a minimum of separate parts, allowing for quick and easy attachment of the arrangement about a tree on which the tree stand is positioned.

It is another object of the invention to provide a securing arrangement that includes a belt which reliably engages the exterior of the tree but does not damage the tree in any way.

It is still a further object of the invention to provide a securing arrangement which only closes when its components are in proper alignment with one another to ensure that the arrangement is properly locked in place.

It is still a further object of the invention to provide a securing arrangement having the above-mentioned qualities that is inexpensive to manufacture.

The present invention is a securing arrangement for a tree stand that holds the stand rigidly against the tree without damaging the tree. The arrangement includes an elongate track or tube attached to either side of the tree stand. The tube is pivotably mounted to the stand allowing the tube to be folded downwardly to a position parallel to the stand for easy transportation. Opposite the tree stand, the tube includes a rectangular cam opening in which is pivotally disposed a locking member, such as a belt cam. The belt cam includes a handle portion extending outwardly from the tube through the opening, and an engaging portion that can be positioned within the tube. The engaging portion includes a number of outwardly extending teeth spaced by grooves that are used to releasably engage a belt inserted into the receiving tube to hold the tree stand section rigidly against the tree.

The belt is formed of a resilient material that includes a number of teeth and grooves alternately spaced along one side of the belt. When positioned against the exterior surface of a tree, the teeth engage the tree and rigidly hold the tree stand against the tree without damaging the exterior surface of the tree. The teeth and grooves on the belt are also used to rigidly hold the belt in releasable engagement with the belt cam. As the belt includes a large number of teeth and grooves, the belt can also be adjusted to closely conform to the circumference of a large number of trees. Furthermore, the engagement of the teeth and grooves on the cam and the belt ensure that the belt is properly secured within the tube by the cam, as the cam cannot be pivoted into the receiving tube in engagement with the belt unless there is a proper locking alignment between the teeth and grooves on the cam and the teeth and grooves on the belt.

To utilize the securing arrangement to hold a tree stand on a tree, the belt cam is pivoted out of the tube to allow the belt to be inserted past the cam. Once the belt is inserted into the tube a desired distance, the cam is pivoted back through the cam opening and into the tube. The teeth and grooves on the engagement portion of the cam mesh with and engage the teeth and grooves located on the belt to reliably and rigidly secure the belt within the receiving tube.

Other features, objects, and advantages of the invention will be made apparent from the following detailed description taken together with the drawings.

DETAILED DESCRIPTION OF THE INVENTION

Figure 1:
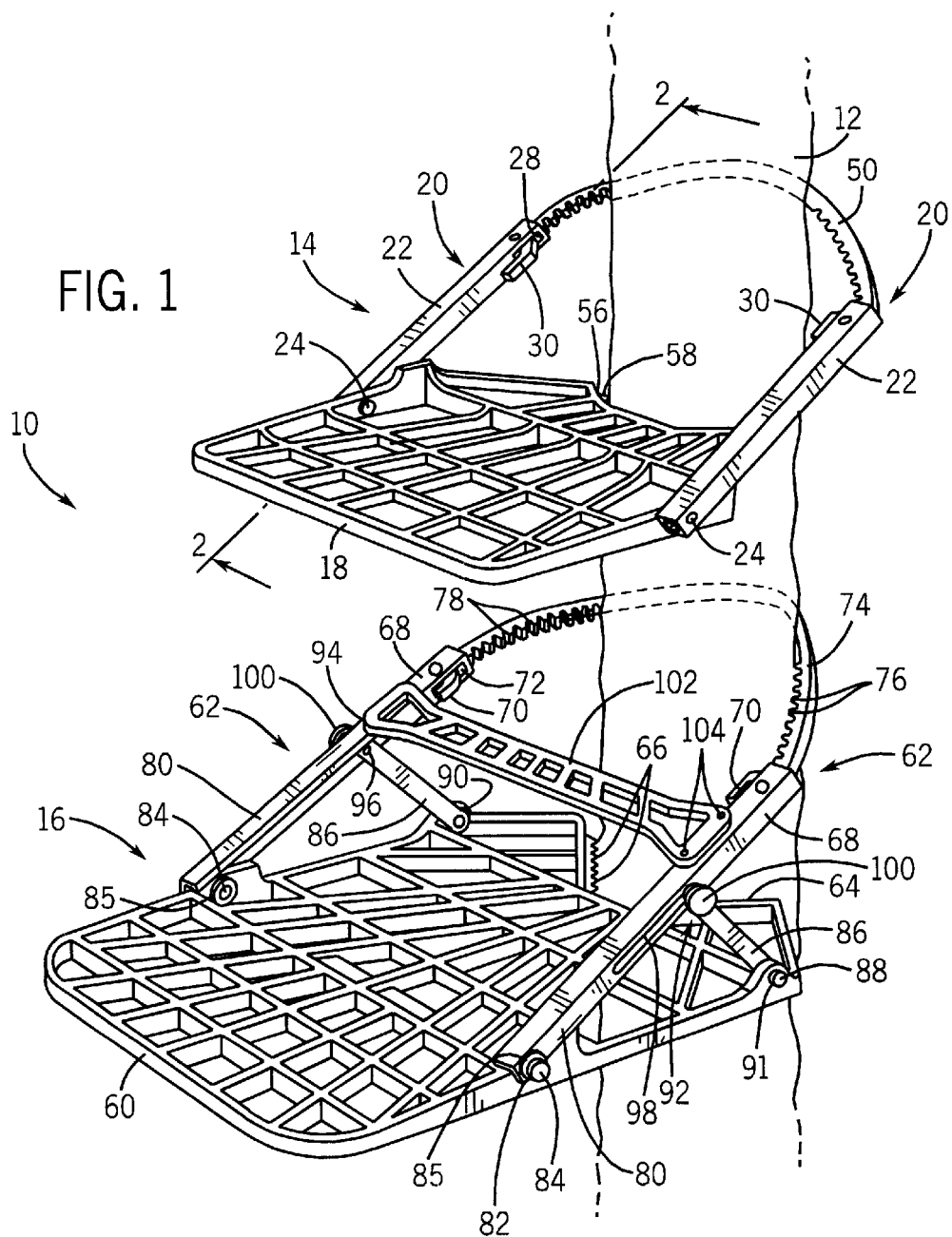
FIG. 1 is an isometric view of a tree stand comprised of two sections secured about a tree, each section of the tree stand secured to the tree by a different embodiment of the securing arrangement of the present invention.
Figure 2:
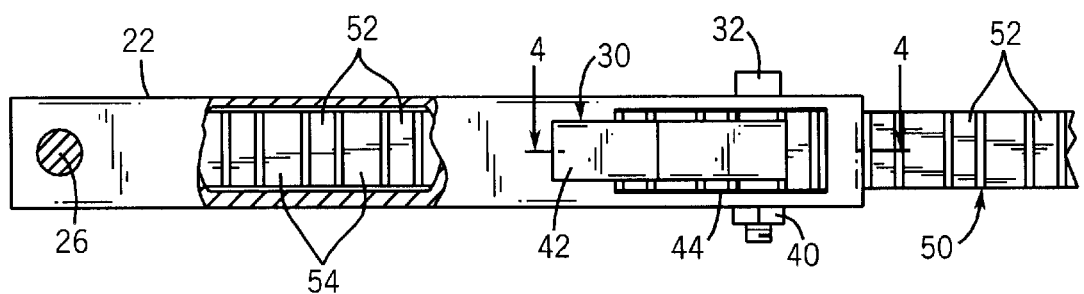
FIG. 2 is a cross-sectional view along line 2—2 of FIG. 1.

With reference now to the drawing Figures in which like reference numerals designate like parts throughout the disclosure, a tree stand constructed according to the present invention indicated generally at 10 is illustrated in FIG. 1. The tree stand 10 is shown attached to a tree 12 and consists of two parts, namely, a seating portion 14 and a footrest portion 16.

The seating portion 14 includes a generally rectangular base 18 and a securing arrangement 20 pivotally attached to opposite sides of the base 18. The securing arrangement 20 includes a pair of elongate square tubes 22 pivotally mounted to the base by a rivet 24 inserted through the side of a base 18 and through a pair of bores 26 in opposite faces of the tubes 22.

Figure 3:
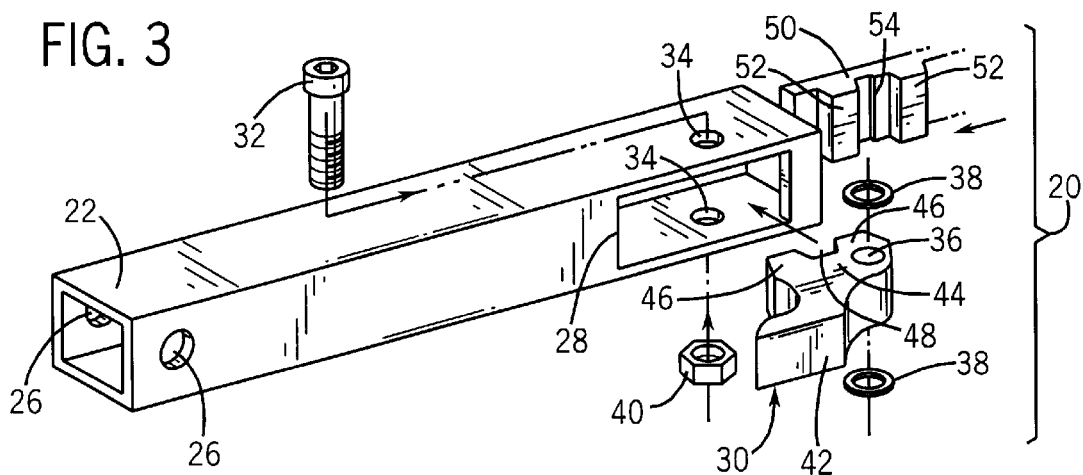
FIG. 3 is an exploded view of the securing arrangement of FIG. 2.

As shown in FIG. 3, on the interior face of each tube 22 opposite the bore 26 positioned against the base 18 is located a rectangular cam mounting opening 28 in which a cam 30 is pivotally disposed. The cam 30 is secured within the cam mounting opening by a bolt 32 inserted through a pair of bores 34 disposed on opposite faces of the tube 22 adjacent the cam mounting opening 28 and through a passage 36 extending through the cam 30. A pair of low friction washers 38 are disposed on either side of the passage 36 between the cam 30 and the tube 22 to facilitate the rotation of the cam 30 about the bolt 32. The bolt 32 is secured to the tube 22 within the bores and cam by a nut 40 threadably engaged with the bolt 32. Alternatively, the tubes 22 can be in the form of U-shaped tracks (not shown) with the cam 30 secured between opposite sides of the track and the rivet 24 secured through the middle section of the track.

Figure 4:
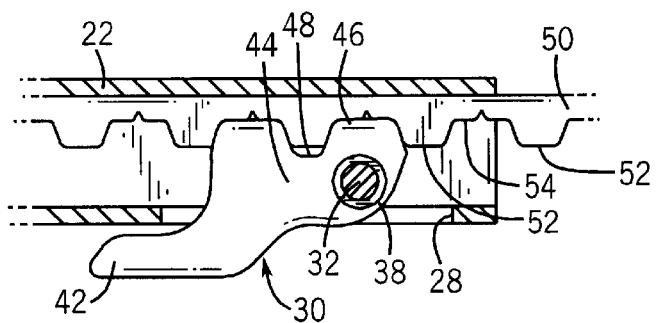
FIG. 4 is a cross-sectional view along line 4—4 of FIG. 2.
Figure 5:
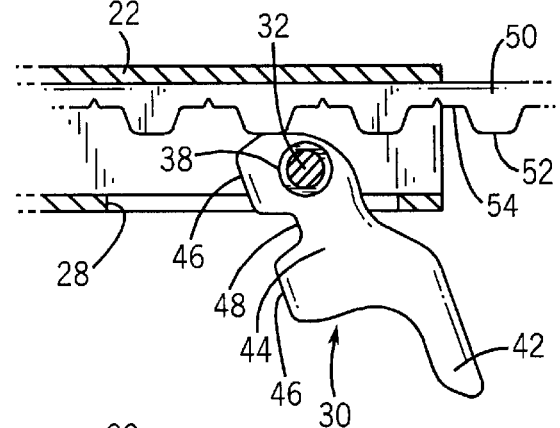
FIG. 5 is a cross-sectional view similar to FIG. 4 and showing the securing arrangement and a disengaged position.
Figure 6:
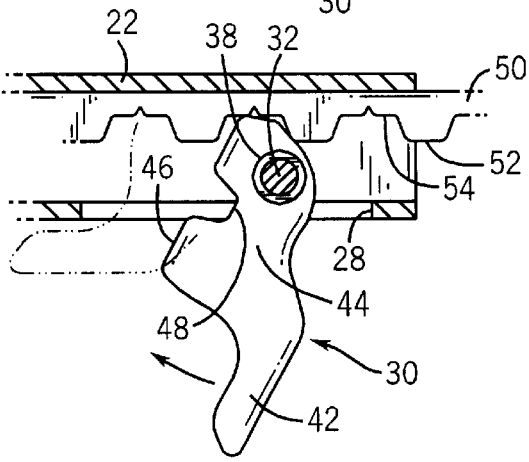
FIG. 6 is a cross-sectional view similar to FIG. 4 showing the securing arrangement in a partially engaged position.

As shown in FIGS. 3–6, the cam 30 includes a handle portion 42 and an engagement portion 44. The handle portion 42 extends outwardly through the cam opening 28 and is used to manually pivot the cam 30 from a fully engaged position, as shown in FIG. 4, to a fully released position, as shown in FIG. 5. The engagement portion 44 includes a pair of teeth 46 separated by a groove 48 that are used to engage a belt 50 to secure the seating portion 14 to the tree 12. The belt 50 can also be secured within the tube 22 by an alternative locking structure, such as a spring-biased pawl (not shown) pivotally mounted to the tube 22 and engagable with the belt 50.

The belt 50 is formed of an elastomeric material and has a number of teeth 52 spaced by grooves 54 disposed along one side of the belt 50. The teeth 52 and grooves 54 are formed to be complementary to the teeth 46 and groove 48 on the engagement portion 44 of the cam 30. This configuration of the teeth 52 and grooves 54 allows the cam 30 to reliably engage and secure the belt 50 within the securing arrangement 20. In an alternative construction, the belt 50 is formed from laminated layers of a resilient material. One layer is shaped to form the teeth 52 and groves 54 along one side and also encases a number of steel cables (not shown) that extend along the length of the belt 50 to increase the tensile strength of the belt. Opposite the layer including the teeth 52 and grooves 54, the second layer is adhered to the first layer opposite the teeth to further encase the cables and to provide a smooth outer side to the belt 50 that slides easily within the tubes 22.

To secure the seating portion 14 to the tree 12, first one of the cams 30 is displaced from within a tube 22 to the position shown in FIG. 5 to allow for the insertion of one end of the belt 50. Once the belt 50 is inserted into the tube 22 to the desired length, the cam 30 is pivoted into the tube 22 such that the teeth 46 on the cam 30 are positioned within the grooves 54 on the belt 50, as shown in FIG. 4. In this position, the belt 50 is pressed against the surface of the tube 22 opposite the cam 30 creating a frictional force between the belt 50 and the tube 22 that assists in holding the belt 50 within the tube 22. The seating portion 14 is then positioned against the exterior surface of the tree 12 such that a generally V-shaped notch 56 in the rear of the base 18 is disposed against the tree 12. The notch 56 is located between the tubes 22 mounted to the base 18 and includes a number of angled projections 58 that extend outwardly from the notch and engage the exterior surface of the tree 12. Once the projections 58 are engaged with the tree 12, the belt 50 is wrapped around the exterior surface of the tree 12 opposite the base 18 such that the teeth 52 on the belt 50 engage the exterior surface of the tree 12. The free end of the belt 50 is then inserted into the remaining tube 22 and secured therein by engaging the cam 30 with the belt 50 when the belt 50 is inserted the desired distance into the tube 22 in the manner described previously.

Referring now to FIG. 1, the footrest portion 16 of the stand 10 comprises a base 60 and a securing arrangement 62 similar to that found in the seating portion 14. The base 60 is generally rectangular in shape and includes a notch 64 including projections 66, formed similarly to the base 18, but is much larger than base 18 to provide a wider surface area for the placement of a hunter's feet while utilizing the tree stand 10.

The securing arrangement 62 includes a pair of generally rectangular elongate tubes 68 that are pivotally mounted to the footrest portion 16, similarly to the securing arrangement 20. The tubes 68 include a pair of cams 70 pivotally mounted within cam mounting openings 72 in each of the tubes 68. The arrangement 62 also includes a belt 74 that includes a number of teeth 76 and grooves 78 alternately spaced along one side of the belt that are engagable with the cam 70 within the tubes 68.

However, the arrangement 62 on footrest portion 16 is pivotally secured to the footrest portion 16 in a significantly different manner from arrangement 20, forming a second embodiment of the invention. In this embodiment, each tube 68 is integrally formed with an L-shaped extension 80 that extends from the tube 68 opposite the cam mounting opening 72. The extension 80 includes a bore 82 located opposite the tube 68 that aligns with an aperture 85 in base 60. A rivet 84 is inserted through the bore 82 and aperture 85 to pivotally secure the extension 80 and tube 68 to the base 60.

The arrangement 62 also includes a support arm 86 pivotally mounted to the base 60 and slideably mounted to the extension 80. The support arm 86 is mounted to the base by a rivet 88 inserted through a bore 90 in one end of the support arm 86 and an aperture 91 in the base 60. Opposite the bore 90, support arm 86 is slideably secured to the extension 80 by a releasable positioning mechanism 92. The mechanism 92 comprises a bolt 94 inserted outwardly through a bore 96 in support arm 86 and through a slot 98 in extension 80, and a threaded handle 100 threadably engaged with the end of bolt 94 protruding the slot 98. When the handle 100 is tightened onto the bolt 94, the handle 100 pulls the bolt 94 and support arm 86 into frictional contact with the interior of the extension 80, locking the support arm 86 and extension 80 in the desired position. Conversely, when the handle 100 is disengaged from the bolt 94, the bolt 94 may slide along the slot 98, allowing both the support arm 86 and extension 80 to pivot downwardly towards the base 60 to form a convenient carrying arrangement for the footrest portion 16.

Lastly, the securing arrangement 62 also includes a brace 102 extending between and secured to each of the tubes 68 by a pair of screws 104. The brace 102 retains the tubes 68 in alignment with one another so that the footrest portion 16 is not positioned against the tree 12 in a tilted or skewed position.

Various alternatives and embodiments are contemplated within the scope of the following claims, particularly pointing out and distinctly claiming the subject matter as the invention.

I claim:

1. A tree stand comprising:
   a) a platform;
   b) a first receiving track secured to one side of the platform, the first track including a first opening;
   c) a first locking mechanism including a first lever pivotally secured within the first opening in the first track by a first pin extending across the first opening and through the first lever, the first lever having a handle portion disposed opposite the pin and extending through the first opening outside of the first track and an engagement portion integrally formed with the handle portion, the engagement portion including a bore through which the first pin is inserted and at least two projections extending outwardly from the engagement portion opposite the handle portion; and
   d) a flexible belt secured to the platform opposite the first track, the belt having a number of teeth spaced along the length of the belt in a configuration generally perpendicular to the length of the belt, the teeth on the belt being selectively intermeshable and engageable with the at least two projections on the engagement portion of the first lever, wherein the first lever is not biased by a spring.

2. The tree stand of claim 1 wherein the handle portion and the engagement portion are connected by an angled portion.

3. The tree stand of claim 1 wherein the first track is generally tubular in shape.

4. The tree stand of claim 3 wherein the first track has a generally square cross section.

5. The tree stand of claim 1 wherein the first track is pivotally secured to the platform.

6. The tree stand of claim 1 wherein the first locking mechanism is positioned on an inner surface of the first track.

7. The tree stand of claim 1 wherein the belt, the first track and the first lever are formed separately from one another.

8. The tree stand of claim 7 wherein the first lever is formed of a metal.

9. The tree stand of claim 1 wherein the engagement portion on the first locking mechanism is partially disposed within the first track.

10. The tree stand of claim 1 wherein the first pin comprises a bolt inserted through the first track and the first locking mechanism and retained therein by engagement with a nut.

11. The tree stand of claim 1 further comprising a second track secured to the platform opposite the first track and including a second opening and which is pivotally secured a second locking mechanism including a second lever pivotally secured within the second opening in the second track by a second pin extending across the second opening through the second lever, the second lever having a handle portion disposed opposite the second pin and extending through the second opening outside of the second track and an engagement portion integrally formed with the handle portion and including a bore through which the second pin is inserted and at least two projections extending outwardly from the engagement portion opposite the handle portion and engageable with the second end of the belt.

12. The tree stand of claim 11 wherein the first track and the second track are interconnected by a generally rigid support.

13. The tree stand of claim 12 further comprising a pair of support arms pivotally mounted to the platform and slidably engaged with each of the first and second tracks.

14. The tree stand of claim 13 wherein each support arm is slidably engaged to the first and second track by an adjustable positioning mechanism attached to the support arm at one end and disposed within a slot disposed on each of the first and second tracks at the opposite end.

15. A method for securing a tree stand to a tree, the method comprising the steps of:
   a) providing a tree stand including a platform, a first track secured to a first side of the platform and including a first opening and a first pair of aligned apertures spaced from the first opening, a first locking member pivotally attached within the first opening by a first pin inserted through the first pair of aligned apertures and through a first bore in the first locking member, the first locking member including a first lever having an engaging portion with at least two outwardly extending projections, and a handle portion integrally formed with the engaging portion and extending outwardly from the first track through the first opening;
   b) providing a belt having a first end and a second end, the belt including a number of teeth spaced along the length of the belt in a configuration generally perpendicular to the length of the belt;
   c) pivoting at least part of the engagement portion of the first locking member out of the first opening;
   d) sliding the first end of the belt into the first track; and
   e) pivoting the engagement portion of the first locking member into the first opening to engage the at least two projections on the engagement portion with the teeth on the first end of the belt.

16. The method of claim 15 wherein the first lever is not biased by a spring.

17. The method of claim 15 further comprising the steps of:
   a) providing a second track disposed on a second side of the platform opposite the first side, the second track including a second opening and a second pair of aligned apertures spaced from the second opening, a second locking member pivotally attached within the second opening by a second pin inserted through the second pair of aligned apertures and through a second bore in the second locking member, the second locking member including a second lever having an engaging portion with at least two outwardly extending teeth, and a handle portion integrally formed with the engagement portion; and
   b) securing the second end of the belt to the platform after pivoting the engagement portion of the first locking member into engagement with the belt.

18. The method of claim 17 wherein the step of securing the second end of the butt to the plastform comprises the steps of:
   a) pivoting the second lever at least partially out of the second opening in the second track;
   b) sliding the second end of the belt into the second track; and
   c) pivoting the second lever into the second opening to engage the at least outwardly extending teeth with the teeth on the second end of the belt.

19. The method of claim 17 wherein the second locking member is not biased by a spring.

20. The method of claim 15 further comprising the steps of:
   a) pivoting the first lever outwardly through the first opening in the first track to disengage the at least two outwardly extending projections from the teeth on the first end of the belt; and
   b) sliding the first end of the belt out of the first track.

* * * * *